United States Patent [19]

Wanner et al.

[11] Patent Number: 4,908,195
[45] Date of Patent: Mar. 13, 1990

[54] PROCESS OF PURIFYING EXHAUST GAS

[75] Inventors: Dieter Wanner, Liederbach; Horst Schade, Frankfurt am Main, both of Fed. Rep. of Germany

[73] Assignee: Metallgesellschaft Aktiengesellschaft, Frankfut am Main, Fed. Rep. of Germany

[21] Appl. No.: 333,746

[22] Filed: Apr. 3, 1989

Related U.S. Application Data

[63] Continuation of Ser. No. 136,904, Dec. 22, 1987, abandoned.

[30] Foreign Application Priority Data

Dec. 23, 1986 [DE] Fed. Rep. of Germany ....... 3644102

[51] Int. Cl.$^4$ ............................. B01J 8/00; C01B 7/00; C01B 21/00; C01B 17/00
[52] U.S. Cl. .................................. 423/239; 425/240; 425/244
[58] Field of Search ............... 423/242 A, 244 A, 239, 423/240 S, 240 R, 242 R, 244 R

[56] References Cited

U.S. PATENT DOCUMENTS

| | | | |
|---|---|---|---|
| 3,880,618 | 4/1975 | McCrea et al. | 423/244 A |
| 4,061,476 | 12/1977 | Holter et al. | 423/244 A |
| 4,273,750 | 6/1981 | Hollett, Jr. et al. | 423/244 |
| 4,309,393 | 1/1982 | Nguyen | 423/244 A |
| 4,388,281 | 6/1983 | Holter et al. | 423/244 A |
| 4,472,364 | 9/1984 | Bauerle et al. | 423/242 A |
| 4,540,555 | 9/1985 | Franke et al. | 423/242 A |
| 4,588,569 | 5/1986 | Cyran et al. | 423/244 |
| 4,600,568 | 7/1986 | Yoon et al. | 423/244 A |
| 4,620,856 | 11/1986 | Rosenberg et al. | 423/242 A |
| 4,804,521 | 2/1989 | Rochelle et al. | 423/244 |

FOREIGN PATENT DOCUMENTS

| | | | |
|---|---|---|---|
| 0077170 | 4/1983 | European Pat. Off. | |
| 0203430 | 5/1986 | European Pat. Off. | |
| 2725436 | 12/1978 | Fed. Rep. of Germany | |
| 3136914 | 3/1983 | Fed. Rep. of Germany | |
| 3235020 | 3/1984 | Fed. Rep. of Germany | |
| 3235559 | 5/1984 | Fed. Rep. of Germany | |
| 3313496 | 10/1984 | Fed. Rep. of Germany | |
| 52-789 | 1/1977 | Japan | 423/239 |
| 2137973 | 11/1984 | United Kingdom | 423/240 |

Primary Examiner—John Doll
Assistant Examiner—Lori F. Cuomo
Attorney, Agent, or Firm—Felfe & Lynch

[57] ABSTRACT

Disclosed is a process for the purification of an exhaust gas which contains dust and gaseous pollutants, such as $SO_2$, $SO_3$, HCl, HF and nitrogen oxides. In the process 70 to 90% of the total amount of sorbent required is introduced as a dry powder into the gas stream and the remaining 10 to 30% of the sorbent is introduced into the gas stream as a solution or suspension after a turbulence has been induced in the gas stream.

14 Claims, 1 Drawing Sheet

PROCESS OF PURIFYING EXHAUST GAS

This application is a continuation of application Ser. No. 136,904, filed Dec. 22, 1987, now abandoned.

BACKGROUND OF THE INVENTION

The present invention is in a process of purifying an exhaust gas which, in addition to dust, contains gaseous pollutants, such as $SO_2$, $SO_3$, HCl, HF and nitrogen oxides, by the addition of sorbents to the gas stream and a dry separation of substantially all pollutant-laden sorbents together with the dust.

Such exhaust gases are formed, e.g., in glass-melting processes and in dependence on the nature and composition of the raw materials and fuels employed will contain, per standard cubic meter, 200 to 1000 mg dust, 500 to 3000 mg $SO_2$ and $SO_3$, wherein the $SO_3$ content is 5 to 10%, about 100 mg HCl, 20 to 50 mg HF and 1500 to 3000 mg nitrogen oxides. Cloth filters and electrostatic precipitators are available, inter alia, for collecting the dust. The gaseous pollutants can be separated by the addition of sorbents and reactants, possibly with the aid of catalysts. The added sorbents may be used in dry, wet and quasi-dry processes.

In the dry processes, sorbent powders are added to the gas stream and after a reaction with, or an attachment of, the pollutant, are separated from the gas stream in most cases together with the dust. The separated substances are often re-introduced into the gas stream in order to improve the utilization of the sorbents and to maintain a higher solids concentration in the gas stream so that the probability of a contact between solid particles and pollutant gas molecules is increased. Dry processes afford the advantage that they exert virtually no influence on the temperature of the exhaust gas.

In wet processes the sorbents are introduced into the gas stream as a solution or suspension. While such a process results in an improved reaction and in an improved separation of pollutants, the exhaust gas stream is inevitably cooled to a high degree. Such wet processes involve considerable heat losses and in many cases require a reheat of the purified exhaust gas stream to the lowest temperature which is permissible in the chimney. The wet processes also require an expensive processing of the sorbent liquor.

The quasi-dry processes are a combination of dry and wet processes. In the quasi-dry processes the sorbents are added as a solution or suspension, as in the wet processes, and the rate of liquid is so controlled that the liquid is entirely evaporated in the exhaust gas stream and the pollutant-laden sorbents can be separated in a dry state together with the dusts. In that case the sorbent liquor need not be processed but the temperature of the exhaust gases is greatly reduced so that heat losses occur.

For various reasons, wet process cannot be used to purify exhaust gases emanating from glass-melting tanks and which contain the above-mentioned pollutants. In practice it is particularly undesirable that the sewage must be treated in a plant which is often described as a separate chemical factory, which involves operating costs and gives rise to unpredictable difficulties.

Whereas dry processes can be used for a satisfactory separation of the dusts and of the $SO_2$ as well as the HF, they do not achieve satisfactory separation of HCl. This relationship is virtually inverted in a certain way as regards the results of the quasi-dry processes, in which all pollutants other than the HF can be separated from the exhaust gas to the prescribed residual concentration with a reasonably low expenditure.

For this reason there is a need for a process for the purification of such exhaust gases which does not have the above-described disadvantages and with which produces a purified exhaust gas containing the pollutants within the legally described limits at an economically justifiable expenditure.

SUMMARY OF THE INVENTION

The above-stated objects and others are obtained in accordance with the process of the present invention. In the invention an exhaust gas containing dust and gaseous pollutants is treated by the addition of an absorbent (sorbent) which is a dry powder in an amount of 70 to 90% of the total amount of sorbent required. A turbulence is subsequently produced in the gas stream, and 10 to 30% of the total amount of sorbent required is then introduced as a solution or suspension into the turbulent gas stream.

The dry sorbent can be $Na_2CO_3$ or $Ca(OH)_2$ or a mixture thereof. The solution can contain $Na_2CO_3$ or NaOH or a mixture thereof. When added to water $Ca(OH)_2$ can form a suitable suspension.

Preferably the amount of sorbent introduced as solution or suspension is determined based on the HCl content of the gas stream. The amount of the solution or suspension introduced should be controlled so that the temperature of the exhaust gas does not drop by more than 10° to 15° C. due to the introduction of the solution or suspension.

The sorbents should be added in an amount such that the treated exhaust gas contains, on a standard cubic meter basis, not in excess of about 400 mg $SO_2$, 5 gm $SO_3$, 30 mg HCl and 5 mg HF.

The sorbents will become laden with the chemically bound pollutants and, along with the dusts, can be collected in dust collection equipment, such as an electrostatic precipitator (esp). The collected substances can be recycled to the exhaust gas. The gas leaving the esp can be introduced into a catalytic converter or subject to a catalytic treatment for elimination of the $NO_x$ components.

DESCRIPTION OF PREFERRED EMBODIMENT

Figure 1:
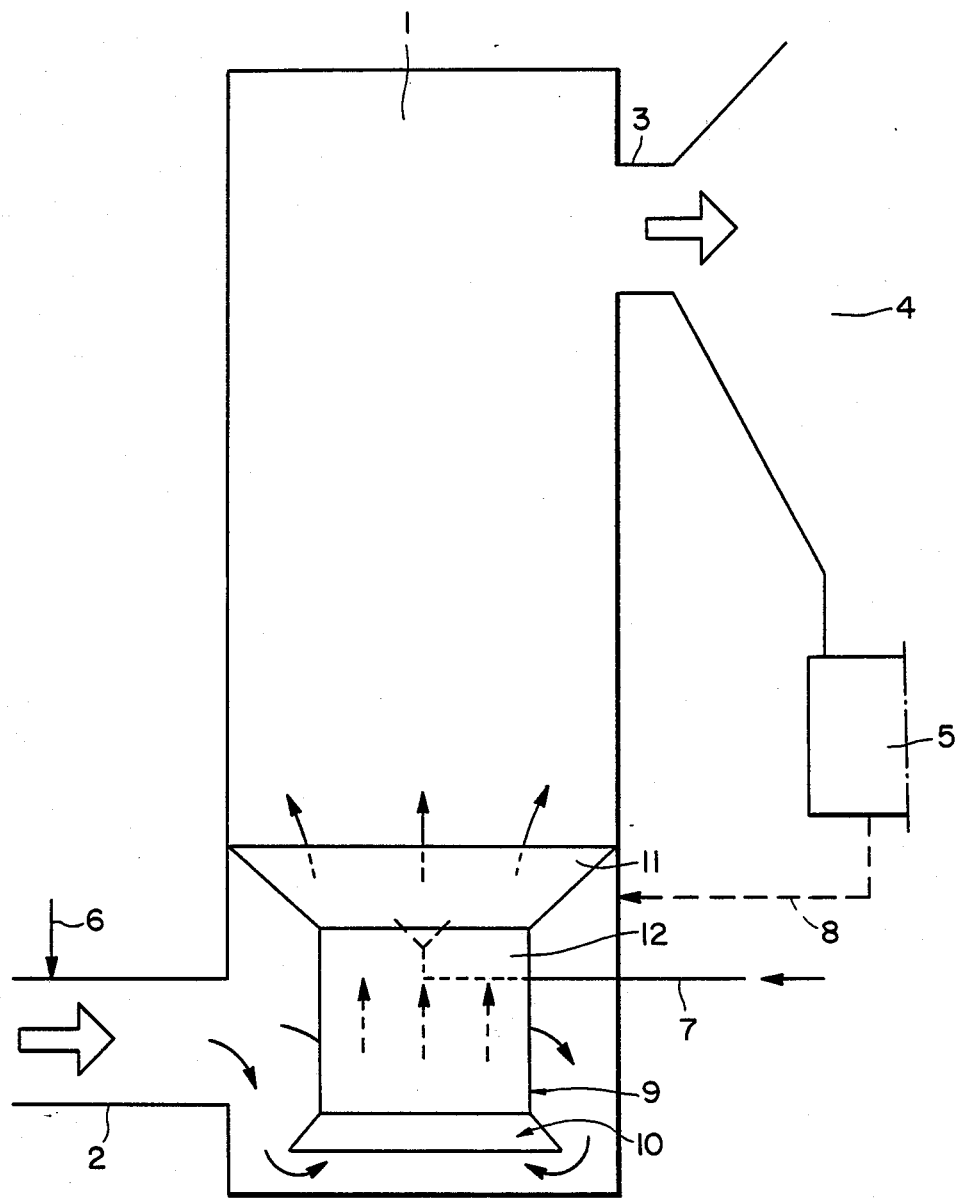
FIG. 1 is a schematic representation of the process in accordance with the invention.

A reaction vessel 1 is shown which may contain internal fixtures for producing a turbulence in the gas stream and which has such dimensions that the exhaust gas will be treated for the desired time. The cross-section will determine the gas velocity and the height will determine the residence or treating time. Reactor 1 is fed with the gas to be purified through supply line 2. Supply line 2 tangentially feed into reactor 1 so that a certain turbulence will be produced in the entering gas stream. 70 to 90% of the total amount of required sorbent is fed in a dry state through line 6 into the incoming exhaust gas stream before it enters the reaction vessel. The remaining 10 to 30% of the sorbent entering the reactor 1 through line 7 is sprayed as a solution or suspension into the reactor. The gas which has been treated flows through line 3 into a dust-collecting electrostatic precipitator 4, which is represented only by its region and by part of the means 5 for withdrawing dust.

A portion of the mixture of dust and pollutant-laden sorbents which becomes available in the dust-collecting electrostatic precipitator 4 may optionally be recycled through recycle line 8 into the reaction vessel 1 in order to obtain a higher solids concentration therein and to improve the utilization of the sorbents.

The processs of the invention affords the advantage that all pollutants can be separated from the exhaust gas except for the permissible residual contents whereas a wet-chemical processing of sewage is not required and high heat losses will not occur. The exhaust gases, which normally become available at 350° to 450° C., are cooled only by 10° to 15° C. so that the nitrogen oxides can subsequently be eliminated by catalytic processing in a temperature range which is favorable for such processing without a need for additional measures.

It will be understood that the specification and examples are illustrative but not limitative of the present invention and that other embodiments within the spirit and scope of the invention will suggest themselves to those skilled in the art.

We claim:

1. A process of purifying an exhaust gas comprising:
   (a) providing an exhaust gas stream at a temperature of about 350° to 450° C. containing dust and gaseous pollutants including $SO_2$, HCl and nitrogen oxides;
   (b) introducing a dry solid absorbent into the gas stream in an amount of 70 to 90% of total required absorbent;
   (c) contacting the gas stream with a fixture to produce a turbulence in the gas stream;
   (d) adding the remainder of the total required absorbent as a solution or suspension to the turbulent gas stream in an amount so that the temperature of the exhaust gas is decreased in an amount of not more than 15° C. to produce a treated gas stream;
   (e) removing dusts and solids from the treated gas stream; and
   (f) catalytically treating the treated gas stream to remove nitrogen oxide therefrom.

2. The process of claim 1 wherein the gas stream also includes $SO_3$ and HF.

3. The process of claim 1 wherein the dry absorbent is sodium carbonate and/or calcium hydroxide.

4. The process of claim 1 wherein sodium hydroxide or sodium carbonate together with water is used as the solution.

5. The process of claim 1 wherein the suspension is calcium hydroxide in water.

6. The process of claim 1 wherein the amount of the absorbent introduced in solution or suspension is determined in dependence on the HCl content of the exhaust gas.

7. The process of claim 1 wherein the absorbent is added in such a total amount that the purified exhaust gas contains not in excess of 400 mg $SO_2$ per standard cubic meter.

8. The process of claim 2 wherein the absorbent is added in such a total amount that the purified exhaust gas contains not in excess of 5 mg $SO_3$ per standard cubic meter.

9. The process of claim 8 wherein the absorbent is added in such a total amount that the purified exhaust gas contains not in excess of 30 mg HCl per standard cubic meter.

10. The process of claim 2 wherein the absorbent is added in such a total amount that the purified exhaust gas contains not in excess of 5 mg HF per standard cubic meter.

11. The process of claim 1 wherein the absorbent becomes laden with pollutants and the pollutant-laden absorbent and the dust are collected in an electrostatic precipitator.

12. The process of claim 11 wherein the collected pollutant-laden absorbent and dust which have been separated are recycled and are re-introduced into the exhaust gas stream which is to be purified.

13. The process of claim 1 wherein the dry solid absorbent is added as a dry powder.

14. The process of claim 1 wherein the temperature of the exhaust gas is decreased in an amount of not more than 10° by the addition of the solution or suspension.

* * * * *